(12) United States Patent
Inoue et al.

(10) Patent No.: US 8,668,414 B2
(45) Date of Patent: Mar. 11, 2014

(54) MACHINE TOOL

(75) Inventors: Atsushi Inoue, Hiroshima (JP); Satoshi Furutate, Shiga (JP); Tomoharu Hasegawa, Shiga (JP); Hiroyuki Domaru, Shiga (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 879 days.

(21) Appl. No.: 12/745,486

(22) PCT Filed: Apr. 11, 2008

(86) PCT No.: PCT/JP2008/057137
§ 371 (c)(1),
(2), (4) Date: May 28, 2010

(87) PCT Pub. No.: WO2009/069325
PCT Pub. Date: Jun. 4, 2009

(65) Prior Publication Data
US 2010/0310331 A1   Dec. 9, 2010

(30) Foreign Application Priority Data

Nov. 29, 2007 (JP) ................. 2007-309057

(51) Int. Cl.
*B23D 7/00* (2006.01)
(52) U.S. Cl.
USPC .......................................... 409/237
(58) Field of Classification Search
USPC ................. 409/237, 131, 141, 212
See application file for complete search history.

(56) References Cited

FOREIGN PATENT DOCUMENTS

| JP | 41-15389 B   | 8/1966  |
|----|--------------|---------|
| JP | 49-100471 A  | 9/1974  |
| JP | 62-99037 A   | 5/1987  |
| JP | 62-47125 B2  | 10/1987 |
| JP | 62-198032 U  | 12/1987 |
| JP | 2-152740 A   | 6/1990  |
| JP | 9-183032 A   | 7/1997  |

OTHER PUBLICATIONS

Notice of Allowance for Korean Application No. 10-2010-7011699 mailed Jul. 30, 2012 with partial English translation.
Notification for Patent Registration Formalities dated Aug. 2, 2012 for Chinese Patent Application No. 200880118364.2 with English translation.
Notification of the Grant of Patent Right for Invention dated Aug. 2, 2012 for Chinese Patent Application No. 200880118364.2 with English translation.

(Continued)

*Primary Examiner* — John C Hong
(74) *Attorney, Agent, or Firm* — Birch, Kolasch & Birch, LLP

(57) ABSTRACT

In a machine tool, a column base (12) is supported on a bed (11) movably in a horizontal direction, and a column (13) is installed vertically on the column base (12). A saddle (14) is supported on a side of the column (13) movably in a vertical direction, and a ram stock (15) is supported on the saddle (14) movably in a horizontal direction. A main spindle (16) is rotatably supported by the ram stock (15). A weight (22) is supported in the column (13) movably in a direction parallel to the ram stock (15), so that the weight (22) can be moved horizontally by a servo motor (23). An NC device (25) moves the weight (22) by the servo motor (23) synchronously with a movement of the ram stock (15), to adjust balance of the column (13), thereby enabling to reduce the size of an apparatus and realize space saving.

5 Claims, 3 Drawing Sheets

(56) References Cited

OTHER PUBLICATIONS

Official Action in corresponding Japanese Patent Application No. 2007-309057 mailed Feb. 5, 2013 with English translation.
Decision of a Patent Grant dated Aug. 6, 2013 for counterpart Japanese Application No. 2007-309057 with an English translation.
Notice of Allowance for Taiwanese Application No. 097127629 dated Sep. 3, 2013, with English language translation.
Notice of Allowance issued in corresponding European Application No. 08 740 235.0 dated Dec. 16, 2013.

MACHINE TOOL

1. FIELD OF THE INVENTION

The present invention relates to a machine tool such as a horizontal boring and milling machine, and, more particularly to a machine tool having a balance adjusting mechanism that adjusts balance when a movable body having a main spindle moves horizontally.

2. DESCRIPTION OF THE RELATED ART

For example, in a horizontal boring and milling machine, a column base is supported on a bed movably along a longitudinal direction of the bed, and a column is installed vertically on the column base. A saddle is supported on the column movably along the vertical direction, and a ram stock is supported on the saddle movably along a horizontal direction orthogonal to a moving direction of the column base. Further, a main spindle is rotatably supported by the ram stock so that a tool can be attached to a tip end of the main spindle.

Therefore, while a predetermined tool is attached to the tip end of the main spindle, a workpiece is held on a side of a table. While the main spindle is rotated in this state, the column base is horizontally moved, the saddle is moved vertically, and the ram stock is moved horizontally, to thereby perform predetermined machining with respect to the workpiece by using the tool.

When the ram stock having the main spindle, to which a tool is attached, moves horizontally, comprehensive center of gravity of the entire column needs to be held constant. Therefore, a moment-balancing weight is provided in the column, and the comprehensive center of gravity of the column is held constant by moving the weight in an opposite direction to a moving direction of the ram stock.

As such a balancing device, there is one disclosed in Patent Document 1. In a head-stock balancing device disclosed in Patent Document 1, a hanging hook is rotatably provided at an upper end of the column, one end of a cable member supported by the hanging hook is connected to the head stock, and the other end of the cable member is connected to a weight, so that when the head stock moves forward, the weight moves backward, to thereby maintain the comprehensive center of gravity of the entire column constant.

Patent Document 1: Japanese Patent Application Publication No. S62-047125

SUMMARY OF INVENTION

Problem to be Solved by the Invention

In the head-stock balancing device mentioned above, the hanging hook is rotatably provided, projected upward of the column, and the end of the cable member suspended from the hanging hook is connected to the head stock and the weight. Therefore, the hanging hook and the cable member project outward of the column, thereby causing a problem in that the apparatus becomes large. Further, because the hanging hook and the cable member move corresponding to the movement of the head stock, a large work space needs to be ensured, taking into consideration an interference with other installations. Therefore, there is a restriction in the installation of the machine tool, and a space for accommodating the entire machine tool increases. Furthermore, in view of a safety aspect, a protective fence needs to be provided around the machine tool, thereby increasing the size of the apparatus, and requiring a useless space.

It is an object of the present invention to at least partially solve the problems in the conventional technology.

Means for Solving Problem

According to an aspect of the present invention, a machine tool has a machine tool body, a horizontally movable body movably supported in a horizontal direction with respect to the machine tool body, and a main spindle rotatably supported by the horizontally movable body, the main spindle can be attached to its tip end a tool. The machine tool includes a weight that is movably supported along a direction parallel to a horizontally movable body inside of a machine tool body; a weight moving unit that moves the weight in the horizontal direction; and a controller that controls the weight moving unit to adjust balance of the horizontally movable body by synchronously moving the weight with a movement of the horizontally movable body.

Advantageously, in the machine tool, a vertically movable body may be movably supported in a vertical direction with respect to the machine tool body, the horizontally movable body may be supported by the vertically movable body movably in the horizontal direction, and the weight may be a heavy load vertically arranged in the machine tool body.

Advantageously, in the machine tool, the weight may include a rotor supported rotatably, the rotor may include a plurality of annular chambers arranged radially parallel to each other, each of annular chambers may enclose a predetermined amount of fluid, and a rotor driving unit that rotates the rotor at a predetermined speed.

Advantageously, in the machine tool, the weight may include a first weight which is a heavy load arranged vertically in the machine tool, and a second weight which is a rotatable rotor in which a plurality of annular chambers is arranged radially parallel to each other, and a predetermined amount of fluid may be enclosed in each annular chamber.

Advantageously, in the machine tool, a tool can be attached to a tip end of the horizontally movable body via an attachment, and a weight of the weight can be adjusted according to the weights of the attachment and the tool.

Effect of the Invention

According to the machine tool of the first aspect of the invention, a weight is movably supported along a direction parallel to a horizontally movable body inside of a machine tool body, and the weight is made movable along a horizontal direction by a weight moving unit. A controller performs control such that the weight is moved by the weight moving unit, synchronously with a movement of the horizontally movable body, to thereby adjust the balance of the horizontally movable body. Because the weight is accommodated movably in the machine tool body, there is no projection outward of the machine tool body, thereby enabling to reduce the size of the apparatus. Further, by moving the weight synchronously with the movement of the horizontally movable body, the weight does not interfere with other installations, and the work space decreases to realize space saving.

According to the present invention, a vertically movable body may be movably supported in a vertical direction with respect to the machine tool body, the horizontally movable body may be supported by the vertically movable body movably in the horizontal direction, and the weight may be a heavy load vertically arranged in the machine tool body. By arranging the weight efficiently in the machine tool body, the comprehensive center of gravity of the machine tool body can be held constant.

According to the present invention, the weight may include a rotor supported rotatably, the rotor may include a plurality of annular chambers arranged radially parallel to each other, each of annular chambers may enclose a predetermined amount of fluid, and a rotor driving unit that rotates the rotor at a predetermined speed. When the rotor is rotated by the rotor drive unit, the fluid in each annular chamber moves to a peripheral side to increase a mass of the entire rotor. Therefore, a weight balance with a heavy horizontally movable body can be adjusted by a low-weight weight, thereby enabling to reduce the size of the apparatus.

According to the present invention, the weight may include a first weight which is a heavy load arranged vertically in the machine tool, and a second weight which is a rotatable rotor in which a plurality of annular chambers is arranged radially parallel to each other, and a predetermined amount of fluid may be enclosed in each annular chamber. Because the weight includes a first weight having a normal weight and a weight-variable second weight, while the weight balance of the machine tool body can be adjusted within an appropriate weight range, the size of the apparatus can be reduced.

According to the present invention, a tool can be attached to a tip end of the horizontally movable body via an attachment, and a weight of the weight can be adjusted according to the weights of the attachment and the tool. The tool can be attached to the tip end of the horizontally movable body via the attachment, and the weight of the attachment can be adjusted according to the weight of the attachment and the tool. Because the weight of the attachment can be adjusted according to the weight of the attachment and the tool, the weight can be appropriately adjusted with respect to the weight of the horizontally movable body fitted with the attachment and the tool, thereby enabling to reduce the size of the apparatus and improve generality.

EXPLANATIONS OF LETTERS OR NUMERALS

Figure 1:
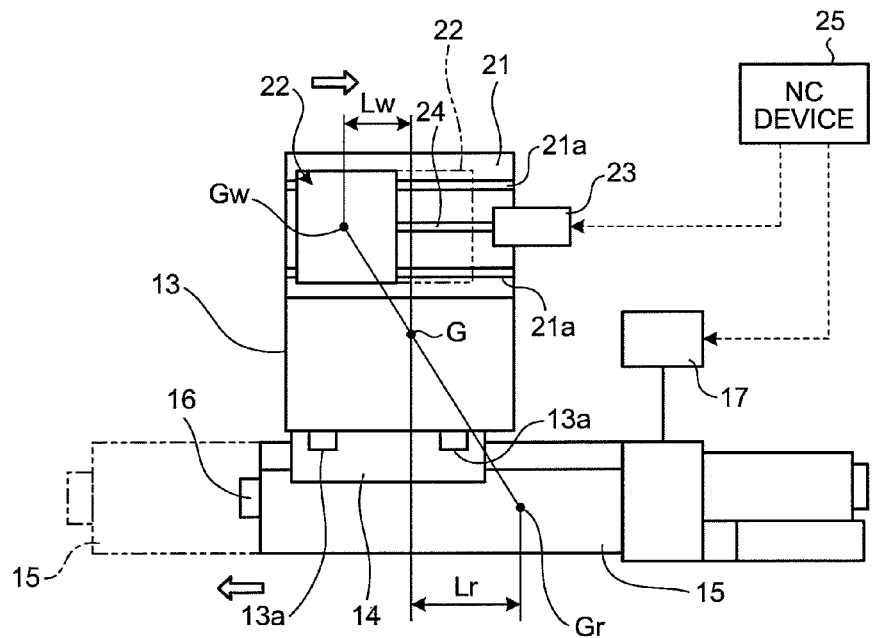
FIG. 1 is a plan view of a horizontal boring and milling machine as a machine tool according to a first embodiment of the present invention.

11 bed
12 column base
13 column
14 saddle (vertically movable body)
15 ram stock (horizontally movable body)
16 main spindle
17 drive motor
22, 31, 41 weight
23 servo motor (weight moving unit)
25 NC device (control unit)
32 rotor
33 drive motor (rotor driving unit)
39a, 39b, 39c annular chambers

DETAILED DESCRIPTION OF THE INVENTION

Exemplary embodiments of a machine tool according to the present invention will be explained below in detail with reference to the accompanying drawings. The present invention is not limited to the embodiments.

First Embodiment

Figure 2:
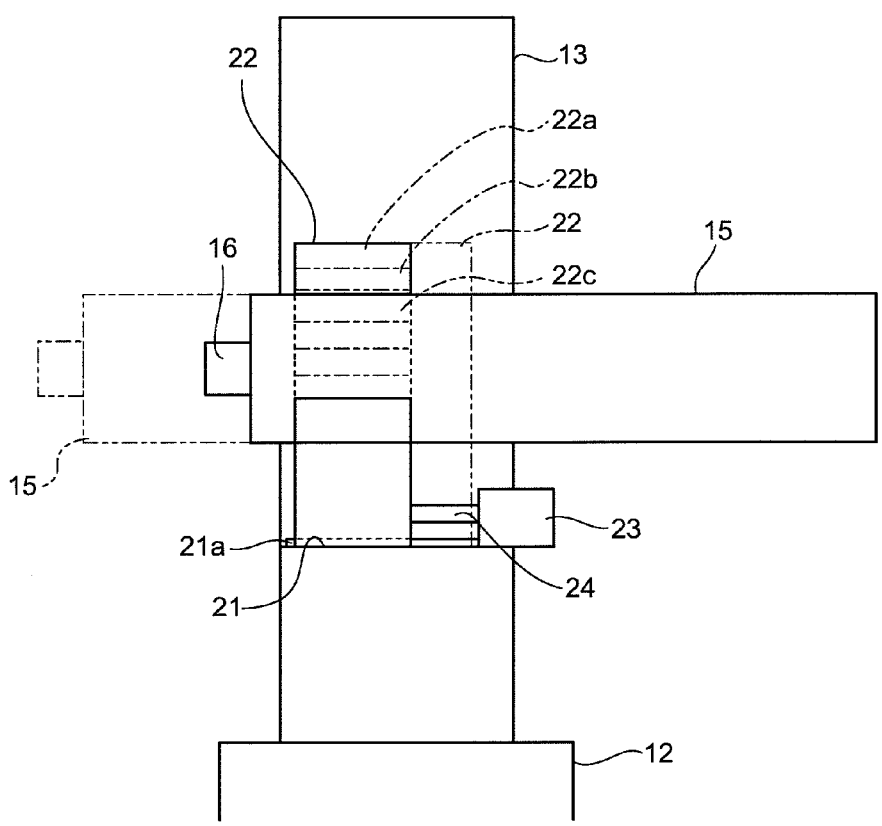
FIG. 2 is a front elevation of the horizontal boring and milling machine according to the first embodiment.
Figure 3:
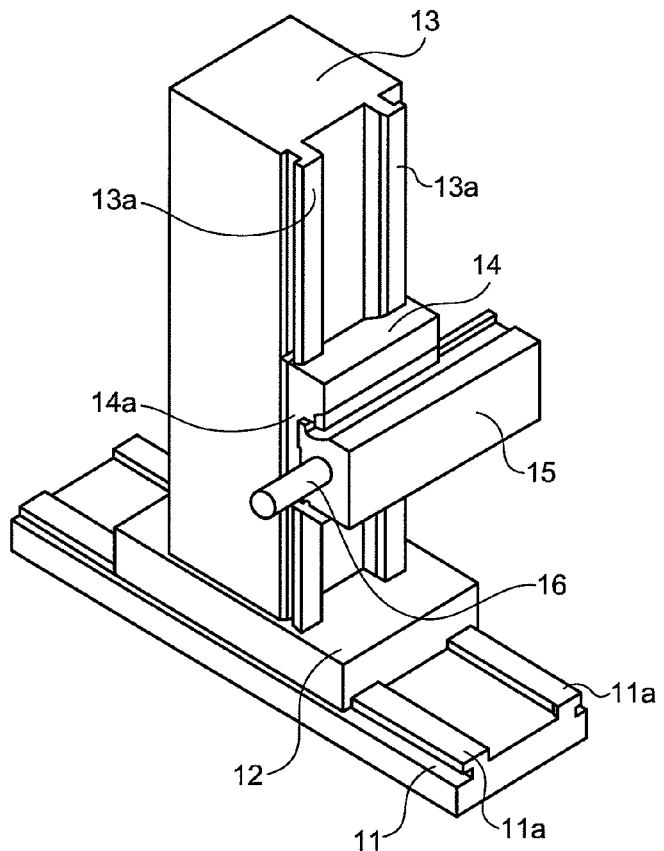
FIG. 3 is a schematic of the horizontal boring and milling machine according to the first embodiment.

FIG. 1 is a plan view of a horizontal boring and milling machine as a machine tool according to a first embodiment of the present invention, FIG. 2 is a front elevation of the horizontal boring and milling machine according to the first embodiment, and FIG. 3 is a schematic of the horizontal boring and milling machine according to the first embodiment.

In the horizontal boring and milling machine according to the first embodiment, as shown in FIG. 3, a pair of guide rails 11a is formed on an upper face of a bed 11 installed at a predetermined position, and a column base 12 is movably supported by the guide rails 11a along the longitudinal direction of the bed 11. A column (machine tool body) 13 formed in a box shape is arranged on the upper face of the column base 12 along the vertical direction. A pair of guide rails 13a is formed on a side of the column 13, and a saddle (vertically movable body) 14 is movably supported by the guide rails 13a along the vertical direction. A pair of guide rails 14a is formed on a side of the saddle 14, and a ram stock (horizontally movable body) 15 is movably supported by the guide rails 14a along the horizontal direction orthogonal to the moving direction of the column base 12. A main spindle 16 projects outward from the ram stock 15 along a direction parallel to the moving direction of the ram stock 15, and is rotatably supported by a bearing (not shown), so that the main spindle 16 can be rotated by a drive motor built in the ram stock 15. The end of the main spindle 16 projects outward from the ram stock 15, so that a tool (not shown) can be attached thereto. A tool can be attached to a tip end of the ram stock 15 via an attachment.

Accordingly, while a predetermined tool is attached to the tip end of the main spindle 16, the workpiece is held on a side of the table 11. In this state, the main spindle 16 is rotated, the column base 12 is horizontally moved, the saddle 14 is vertically moved, and the ram stock 15 is horizontally moved to perform predetermined machining with respect to the workpiece by the tool.

In this case, the column base 12 and the saddle 14 can be moved by a drive unit (not shown), and the ram stock 15 can be moved by a drive motor 17 (see FIG. 1).

As shown in FIGS. 1 and 2, the column 13 has a hollow shape, and a horizontal support face 21 is formed therein. Guide rails 21a are formed on the support face 21 parallel to a moving direction of the ram stock 15, and a weight 22 is supported movably in a horizontal direction along the guide rails 21a. The weight 22, which is an iron heavy load having a weight corresponding to the weight of the ram stock 15, is installed vertically above the support face 21 and accommodated in the column 13.

As shown in FIGS. 1 and 2, a servo motor (weight moving unit) 23 is fixed on the support face 21 in the column 13, and a ball screw 24 tightly fixed to an output shaft of the servo motor 23 is screwed together with the weight 22. Therefore, the ball screw 24 is rotated by driving the servo motor 24, to thereby reciprocate the weight 22 screwed with the ball screw 24 horizontally along the guide rails 21a. The servo motor 23 is an electric motor capable of performing feedback (closed loop) control, using a rotational speed or a rotational position of the output shaft as a target value, and for example, is a permanent-magnet synchronous motor (a blushless DC motor).

A numerical control machining (NC) device 25 as a control unit in the present invention can control a numerical value of the column base 12, the saddle 14, the ram stock 15, and the main spindle 16 based on preset NC program data (machining data). That is, the NC device 25 drives and controls the drive motor 17 based on the NC program data, thereby enabling to control the movement of the ram stock 15. The NC device 25 also drives and controls the servo motor 23 synchronously with the movement of the ram stock 15, to thereby move the weight 22 to adjust the balance of the ram stock 15, that is, adjust the balance of the column 13 so that the comprehensive center of gravity of the entire column 13 becomes constant.

In this case, when it is assumed that the center of gravity of the column 13 is G, the center of gravity of the ram stock 15 is Gr, the center of gravity of the weight is Gw, the mass of the ram stock 15 is mr, the mass of the weight is mw, a distance from the center of gravity G of the column 13 to the center of gravity Gr of the ram stock 15 is Lr, and the distance from the center of gravity G of the column 13 to the center of gravity Gw of the weight is Lw, the NC device 25 control the drive unit of the servo motor 23 with respect to the drive control of the drive motor 17, so that the following equation is established.

$$Lw=(mr/mw)\cdot Lr$$

Therefore, the NC device 25 controls the drive unit of the drive motor 17 based on the NC program data to move the ram stock 15, to thereby perform predetermined machining. On the other hand, the NC device 25 controls the drive unit of the servo motor 23 according to the movement of the ram stock 15, to move the weight 22 in a direction opposite to the direction of the ram stock 15, so that the comprehensive center of gravity of the entire column 13 becomes constant.

In the horizontal boring and milling machine according to the first embodiment, the tool can be attached to the main spindle 16 of the ram stock 15, and also to the tip end of the ram stock 15 via the attachment. The shape and the weight of the attachment vary according to a processing method and a tool type. Therefore, for example, as shown by a two-dot chain line in FIG. 2, the weight 22 can include divided weights 22a, 22b, 22c, . . . , so that the total weight of the weight 22 loaded on the column 13 can be adjusted according to the weights of the attachment and the tool.

In the horizontal boring and milling machine according to the first embodiment, the column base 12 is supported on the bed 11 movably in the horizontal direction, the column 13 is installed vertically on the column base 12, the saddle 14 is supported on the side of the column 13 movably in the vertical direction, the ram stock 15 is supported on the saddle 14 movably in the horizontal direction, and the main spindle 16 is rotatably supported by the ram stock 15. Further, the weight 22 is supported in the column 13 movably along a direction parallel to the ram stock 15, and is also movable in the horizontal direction by the servo motor 23. The NC device 25 moves the weight 22 by the servo motor 23 synchronously with the movement of the ram stock 15, thereby adjusting the balance of the column 13.

Therefore, because the weight 22 is accommodated movably in the column 13, there is no projection outward of the column 13, thereby enabling to reduce the size of the apparatus. Further, by horizontally moving the weight 22 in the column 13 synchronously with the movement of the ram stock 15, to adjust the weight balance of the column 13, the weight 22 does not interfere with other installations, and the work space decreases to realize space saving.

Further, in the horizontal boring and milling machine according to the first embodiment, the saddle 14 is supported vertically movably with respect to the column 13, and the weight 22 is a heavy load arranged vertically in the column 13. Therefore, by efficiently arranging the weight 22 in the column 13, a weight sufficient for adjusting the balance of the column 13 can be ensured. Further, the comprehensive center of gravity of the entire column 13 including the ram stock 15 can be maintained constant, and the column 13 does not become large in the horizontal direction, thereby enabling space saving.

Further, in the horizontal boring and milling machine according to the first embodiment, the tool can be attached to the tip end of the main spindle 16, or to the tip end of the ram stock 15 via the attachment. The weight 22 includes divided weights 22a, 22b, 22c, . . . , so that the total weight of the weight 22 can be adjusted according to the weights of the attachment and the tool. Therefore, the divided weights 22a, 22b, 22c, . . . can be attached or detached corresponding to a weight change of the ram stock 15 equipped with the attachment and the tool, to adjust the weight of the weight 22, thereby enabling to reduce the size of the apparatus and improve the generality.

Second Embodiment

Figure 4:
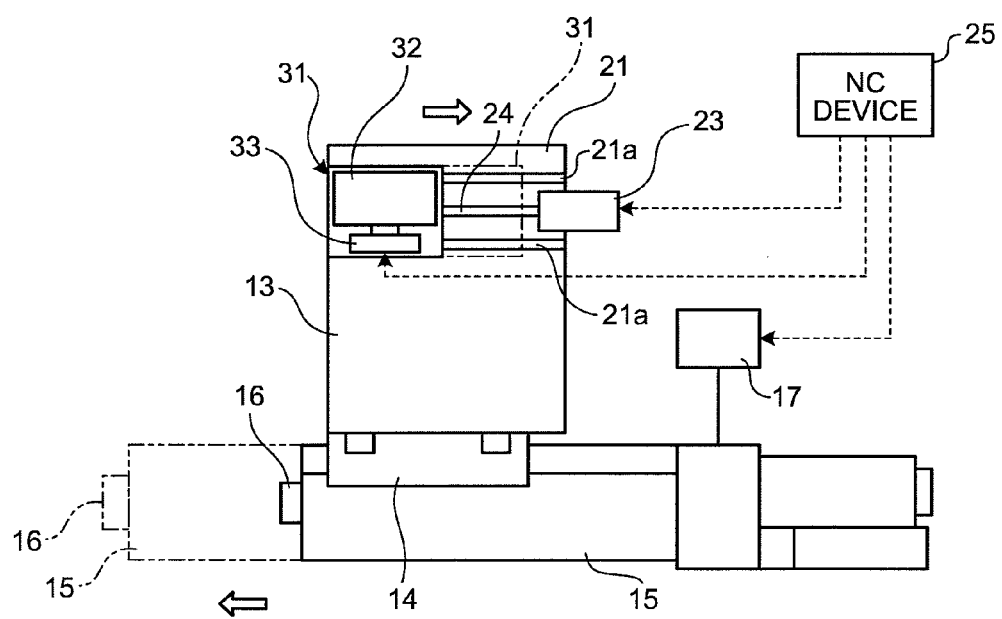
FIG. 4 is a plan view of a horizontal boring and milling machine as a machine tool according to a second embodiment of the present invention.
Figure 5:
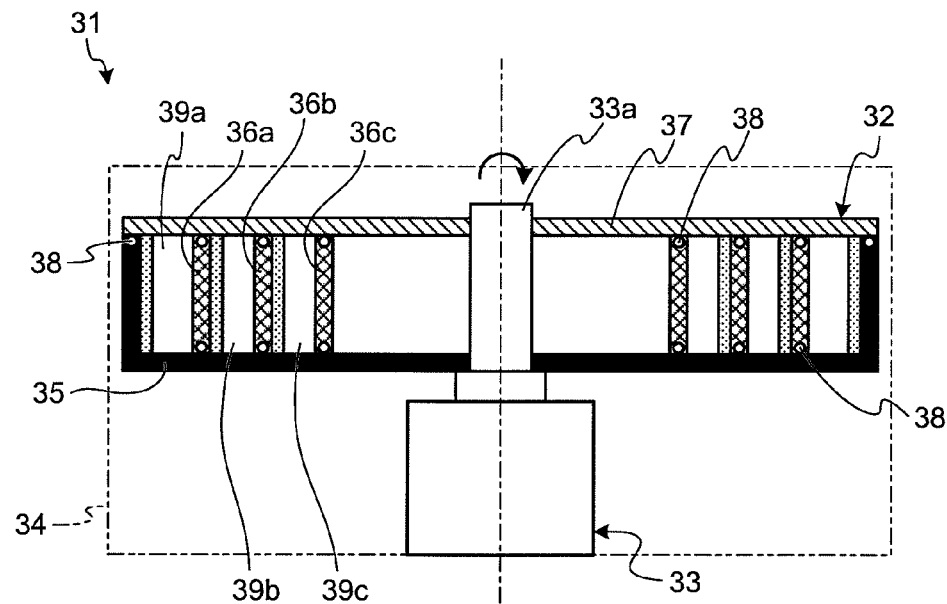
FIG. 5 is a schematic of a weight attached to the horizontal boring and milling machine according to the second embodiment.

FIG. 4 is a plan view of a horizontal boring and milling machine as a machine tool according to a second embodiment of the present invention, and FIG. 5 is a schematic of the weight attached to the horizontal boring and milling machine according to the second embodiment. Like reference numerals refer to like parts having the same function as in the above embodiment, and redundant explanations thereof will be omitted.

In the horizontal boring and milling machine according to the second embodiment, as shown in FIG. 4, the saddle 14 is supported movably vertically along guide rails 12a by the column 13 installed vertically on the column base 12 (not shown). The ram stock 15 is supported by the saddle 14 movably horizontally along guide rails 14a. The main spindle 16 is rotatably supported in the ram stock 15, and the tool can be attached to the tip end of the main spindle 16. The tool can be also attached to the tip end of the ram stock 15 via the attachment (not shown). In this case, the ram stock 15 is made movable by the drive motor 17.

The column 13 has a hollow shape, and equipped with guide rails 21a on the support face 21 thereof parallel to the moving direction of the ram stock 15. The servo motor 23 is fixed on the support face 21 of the column 13, and the ball screw 24 tightly fixed to the output shaft of the servo motor 23 is screwed together with a weight 31. Therefore, by driving the servo motor 23, the weight 31 can be horizontally reciprocated horizontally along the guide rails 21a via the ball screw 24.

The weight 31 includes a rotor 32 supported rotatably, in which a plurality of annular chambers is arranged radially parallel to each other, and a predetermined amount of fluid is enclosed in each annular chamber, and a drive motor (rotor driving unit) 33 that rotates the rotor 32 at a predetermined speed, and arranged so that the center of a rotation axis of the rotor 32 is along the horizontal direction. That is, as shown in FIGS. 4 and 5, a housing 34 of the weight 31 is movably supported on the guide rails 21a attached to the support face 21 of the column 13. The housing 34 is in a hollow box shape, the drive motor 33 is fixed therein, and the rotor 32 is tightly fixed on an output shaft 33a of the drive motor 33. In the rotor 32, a plurality of (in the second embodiment, three) partition plates 36a, 36b, and 36c in a ring shape having different diameters is fixed in a case 35 with an upper part being opened, and a lid 37 in an disk shape is fixed above thereof. O-rings 38 as a sealing member are attached to a contact portion between the case 35, the partition plates 36a, 36b, and 36c, and the lid 37.

Therefore, a plurality of annular chambers 39a, 39b, and 39c are radially divided by the case 35, the partition plates 36a, 36b, and 36c, and the lid 37, and a predetermined amount of water as the fluid is enclosed in the respective annular chambers 39a, 39b, and 39c.

Therefore, when the rotor 32 is rotated by the drive motor 33, the water enclosed in the respective annular chambers 39a, 39b, and 39c adheres to a circumferential wall thereof due to a centrifugal force, to generate a mass, which is obtained by multiplying a volume of the rotor 32 by a density of water, thereby increasing the mass of the entire rotor 32. That is, if it is assumed that the density of water is ρ, each radius of the rotor 32 (annular chambers 39a, 39b, 39c) is Ra, Rb, and Rc, and a depth of the rotor 32 (annular chambers 39a, 39b, 39c) is L, when the rotor 32 rotates, an additional mass mf due to the water enclosed in the rotor 32 takes a value calculated by a following numerical expression:

$$mf = \pi \times \rho \times (Ra^2 + Rb^2 + Rc^2) \times L.$$

The additional mass mf calculated by the numerical expression is equal to the mass when the respective annular chambers 39a, 39b, and 39c in the rotor 32 are filled with water, and by forming the annular chambers 39a, 39b, and 39c, a plurality of cavities where there is no water is provided, thereby enabling to reduce the mass at the time of stopping the rotation of the rotor 32.

In this case, for example, when the radius of the rotor is set to 0.25 millimeter, the height thereof is set to 0.2 millimeter, the annular chambers are formed in five layers and enclosed with water, and the mass of the rotor at this time is about 5 kilograms, if the rotor is rotated at a speed equal to or higher than a predetermined speed, the mass becomes about 120 kilograms, thereby enabling to reduce the mass of water to 1/24.

Water is enclosed as the predetermined amount of fluid in the respective annular chambers 39a, 39b, and 39c formed in the rotor 32; however, the present invention is not limited thereto. For example, by using Galinstan (a eutectic alloy of gallium, indium, and tin) or mercury as the fluid, the weight can be further reduced.

Further, the NC device 25 can perform numerical control of the saddle 14, the ram stock 15, and the main spindle 16 with respect to the column 13 based on the preset NC program data. That is, the NC device 25 can perform numerical control with respect to the movement of the ram stock 15 by controlling the drive unit of the drive motor 17 based on the NC program data. Further, the NC device 25 can rotate the rotor 32 by driving the drive motor 33 for the weight 31 to generate the additional mass. The NC device 25 controls the drive unit of the servo motor 23 synchronously with the movement of the ram stock 15, to move the weight 31 in which the additional mass has been generated, to thereby adjust the balance of the ram stock 15, that is, adjust the balance of the column 13, so that the comprehensive center of gravity of the entire column 13 becomes constant.

Therefore, the NC device 25 first rotates the rotor 32 by the drive motor 33 at a speed equal to or higher than the predetermined speed, to generate the additional mass in the water enclosed in the rotor 32, to thereby increase the mass of the entire weight 31. The NC device 25 then controls the drive unit of the drive motor 17 in this state based on the NC program data to move the ram stock 15, to thereby perform predetermined machining. On the other hand, the NC device 25 controls the drive unit of the servo motor 23 corresponding to the movement of the ram stock 15, to move the weight in a direction opposite to the direction of the ram stock 15, so that the comprehensive center of gravity of the entire column 13 becomes constant.

Thus, in the horizontal boring and milling machine according to the second embodiment, the saddle 14 is supported on the side of the column 13 movably in the vertical direction, the ram stock 15 is supported on the saddle 14 movably in the horizontal direction, and the main spindle 16 is rotatably supported by the ram stock 15. Further, the weight 31 is supported movably in the column 13, and the weight 31 includes the rotor 32 supported rotatably, in which a plurality of annular chambers 39a, 39b, and 39c is arranged radially parallel to each other, and water is enclosed in each annular chamber 39a, 39b, 39c, and the drive motor 33 that rotates the rotor 32 at a predetermined speed. The weight 31 is movable in the horizontal direction by the servo motor 23, and the NC device 25 moves the weight 31 by the servo motor 23 synchronously with the movement of the ram stock 15, thereby adjusting the balance of the column 13.

Therefore, because the weight 31 is accommodated movably in the column 13, there is no projection outward of the column 13, thereby enabling to reduce the size of the apparatus. Further, by horizontally moving the weight 31 in the column 13 synchronously with the movement of the ram stock 15, to adjust the weight balance of the column 13, the weight 31 does not interfere with other installations, and the work space decreases to realize space saving.

Further, in the horizontal boring and milling machine according to the second embodiment, the weight 31 includes the rotatable rotor in which water is enclosed in the respective annular chambers 39a, 39b, and 39c, and the drive motor 33 that rotates the rotor 32 at a predetermined speed. Therefore, when the rotor 32 is rotated by the drive motor 33, the water in the respective annular chambers 39a, 39b, and 39c moves to the peripheral side to increase the mass of the entire rotor 32. By reducing the mass of the rotor 32 at the time of stopping the rotation thereof, the weight balance between the weight 31 and the heavy ram stock 15 can be adjusted by a low-weight weight 31, thereby enabling to further reduce the size of the apparatus.

In the second embodiment, three annular chambers 39a, 39b, and 39c are formed in the rotor 32 constituting the weight 31, and water is enclosed therein. However, the number of the annular chambers can be appropriately set according to the size of the rotor or the weight of the ram stock 15.

Further, in the horizontal boring and milling machine according to the second embodiment, the tool can be attached to the main spindle 16 of the ram stock 15, and also to the tip end of the ram stock 15 via the attachment. The shape and the weight of the attachment vary according to the processing method and the tool type. Therefore, for example, by forming a plurality of annular chambers in the rotor 32 constituting the weight 31 and supplying or exhausting a fluid to or from each annular chamber, the number of the annular chambers, whose mass increases or decreases due to the rotation, can be adjusted, and the total weight of the weight 31 loaded in the column 13 can be adjusted according to the weight of the attachment and the tool.

Third Embodiment

Figure 6:
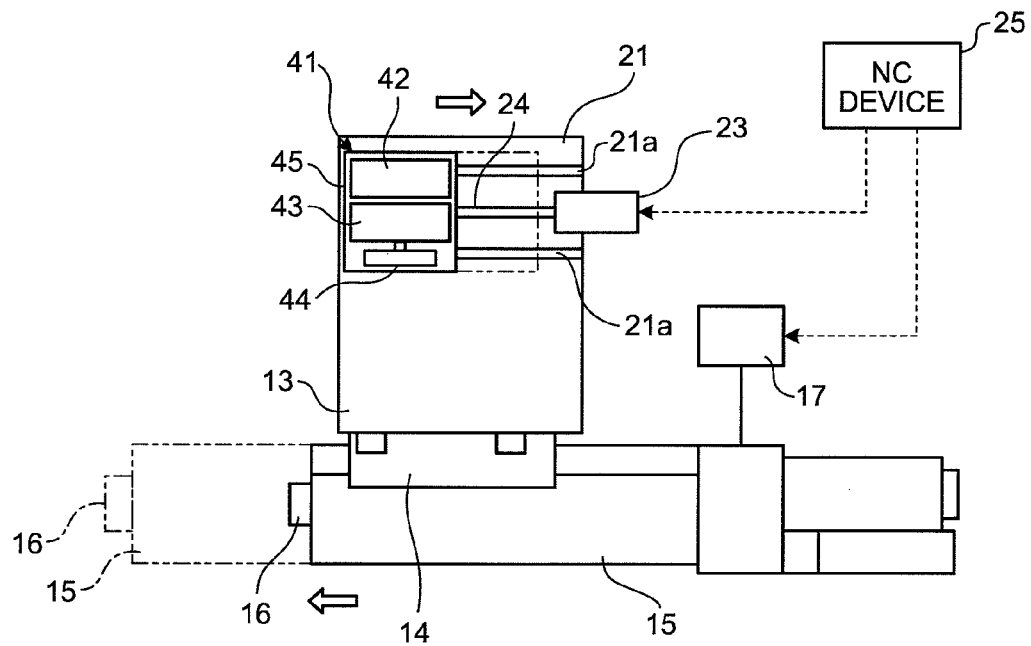
FIG. 6 is a plan view of a horizontal boring and milling machine as a machine tool according to a second embodiment of the present invention.

FIG. 6 is a plan view of a horizontal boring and milling machine as a machine tool according to a third embodiment of the present invention. Like reference numerals refer to like parts having the same function as in the above embodiments, and redundant explanations thereof will be omitted.

In the horizontal boring and milling machine according to the third embodiment, as shown in FIG. 6, the saddle 14 is supported movably vertically along guide rails 12a by the column 13 installed vertically on the column base 12 (not shown). The ram stock 15 is supported by the saddle 14 movably horizontally along guide rails 14a. The main spindle 16 is rotatably supported in the ram stock 15, and the tool can be attached to the tip end of the main spindle 16. In this case, the ram stock 15 is made movable by the drive motor 17.

The column 13 has a hollow shape, and equipped with guide rails 21a on the support face 21 thereof parallel to the moving direction of the ram stock 15. A weight 41 is supported movably horizontally along the guide rails 21a. The servo motor 23 is fixed on the support face 21 of the column 13, and the ball screw 24 tightly fixed to the output shaft of the servo motor 23 is screwed together with the weight 41. Therefore, by driving the servo motor 23, the weight 41 can be horizontally reciprocated horizontally along the guide rails 21a via the ball screw 24.

The weight 41 is accommodated in the column 13, and includes a first weight 42, which is a metal heavy load, and a second weight 43, which is a rotatable rotor in which a plurality of annular chambers is arranged radially parallel to each other, and a predetermined amount of fluid is enclosed in each annular chamber. In this case, the first weight 42 has the same configuration as that of the weight 22 explained in the first embodiment, and the second weight 43 includes a rotor 43 and a drive motor 44. The second weight 43 has the same configuration as that of the weight 31 explained in the second embodiment, and these weights are accommodated in a housing 45 and integrally formed. Detailed explanations of the first weight 42 and the second weight 43 will be omitted.

Therefore, when the rotor 43 is rotated by the drive motor 44, the fluid enclosed in the respective annular chambers adheres to the circumferential wall thereof due to the centrifugal force, to generate a mass, which is obtained by multiplying the volume of the rotor 43 by a density of the fluid, thereby increasing the mass of the entire rotor 43.

The NC device 25 can perform numerical control of the saddle 14, the ram stock 15, and the main spindle 16 with respect to the column 13 based on the preset NC program data. That is, the NC device 25 can perform numerical control with respect to the movement of the ram stock 15 by controlling the drive unit of the drive motor 17 based on the NC program data. Further, the NC device 25 can rotate the rotor 43 by driving the drive motor 44 for the weight 41 to generate the additional mass. The NC device 25 controls the drive unit of the servo motor 23 synchronously with the movement of the ram stock 15, to move the weight 41 in which the additional mass is generated, to thereby adjust the balance of the ram stock 15, that is, adjust the balance of the column 13, so that the comprehensive center of gravity of the entire column 13 becomes constant.

Therefore, the NC device 25 first rotates the rotor 43 by the drive motor 44 at a speed equal to or higher than a predetermined speed, to generate the additional mass in the water enclosed in the rotor 43, to thereby increase the mass of the entire weight 41. The NC device 25 then controls the drive unit of the drive motor 17 in this state based on the NC program data to move the ram stock 15, to thereby perform predetermined machining. On the other hand, the NC device 25 controls the drive unit of the servo motor 23 corresponding to the movement of the ram stock 15, to move the weight in a direction opposite to the direction of the ram stock 15, so that the comprehensive center of gravity of the entire column 13 becomes constant.

Thus, in the horizontal boring and milling machine according to the third embodiment, the saddle 14 is supported on the side of the column 13 movably in the vertical direction, the ram stock 15 is supported on the saddle 14 movably in the horizontal direction, and the main spindle 16 is rotatably supported by the ram stock 15. Further, the weight 41 is supported movably in the column 13, and the weight 41 includes the first weight 42, which is the metal heavy load, and the second weight 43, which is a rotatable rotor in which a plurality of annular chambers is arranged radially parallel to each other, and a predetermined amount of fluid is enclosed in each annular chamber. The weight 41 is made movable in the horizontal direction by the servo motor 23, and the NC device 25 moves the weight 41 by the servo motor 23 synchronously with the movement of the ram stock 15, to thereby adjust the balance of the column 13.

Therefore, because the weight 41 is accommodated movably in the column 13, there is no projection outward of the column 13, thereby enabling to reduce the size of the apparatus. Further, by horizontally moving the weight 41 in the column 13 synchronously with the movement of the ram stock 15, to adjust the weight balance of the column 13, the weight 41 does not interfere with other installations, and the work space decreases to realize space saving.

Further, in the horizontal boring and milling machine according to the third embodiment, the weight 41 includes the first weight 42, which is the metal heavy load vertically arranged in the column 13, and the second weight 43, which is the rotatable rotor in which a plurality of annular chambers is arranged radially parallel to each other, and a predetermined amount of fluid is enclosed in each annular chamber. Therefore, because the weight 41 includes the first weight 42 having the normal weight and the weight-variable second weight, while the weight balance of the column 13 can be adjusted within an appropriate weight range, the size of the apparatus can be reduced.

Further, in the horizontal boring and milling machine according to the third embodiment, the tool can be attached to the main spindle 16 of the ram stock 15, and also to the tip end of the ram stock 15 via the attachment. The shape and the weight of the attachment vary according to the processing method and the tool type. Therefore, for example, by rotating or stopping the rotation of the rotor 43 of the second weight 43, the weight of the weight 41 can be changed, thereby enabling to adjust the total weight of the weight 41 loaded in the column 13 according to the weight of the attachment and the tool.

In this case, the annular chambers in the rotor 43 can be made rotatable individually. By selecting an annular chamber to be rotated, the total weight of the weight 41 loaded in the column 13 can be adjusted according to the weight of the attachment and the tool.

In the respective embodiments, the weight moving unit in the present invention is configured as the servo motor 23, and the servo motor 23 and the weight 22, 31, 41 are coupled together via the ball screw. However, the present invention is not limited to this configuration. For example, a linear motor and a linear guide, or a shaft motor can be applied.

The application of the machine tool according to the present invention to the horizontal boring and milling machine has been explained above. However, the same operating effects can be obtained by applying the machine tool of the present invention to other machine tools, so long as a horizontally movable body having a main spindle in the machine tool body is horizontally movable.

INDUSTRIAL APPLICABILITY

According to a machine tool of the present invention, a downsizing and small-space of a device can be achieved, and can be applied to any machine tool.

The invention claimed is:

1. A machine tool including a column arranged on an upper face of a column base along a vertical direction, a horizontally movable body supported by the column so as to be movable in a horizontal direction with respect to the column, and a main spindle which is rotatably supported by the horizontally movable body and configured to be attachable with a tool on a tip end thereof, the machine tool comprising:
   a weight that is movably supported along a direction parallel to a horizontally movable body inside of the column;
   a weight moving unit that moves the weight in the horizontal direction; and
   a control unit that controls the weight moving unit to adjust balance of the horizontally movable body by synchronously moving the weight in a direction opposite to the direction of the horizontally movable body inside of the column with a movement of the horizontally movable body.

2. The machine tool according to claim 1, wherein a vertically movable body is movably supported in a vertical direction with respect to the column, the horizontally movable body is supported by the vertically movable body movably in the horizontal direction, and the weight is a heavy load vertically arranged in the column.

3. The machine tool according to claim 1, wherein the weight includes a rotor supported rotatably, the rotor includes a plurality of annular chambers arranged radially parallel to each other, each of annular chambers encloses a predetermined amount of fluid, and a rotor driving unit that rotates the rotor at a predetermined speed.

4. The machine tool according to claim 1, wherein the weight includes a first weight which is a heavy load arranged vertically in the column, and a second weight which is a rotatable rotor in which a plurality of annular chambers is arranged radially parallel to each other, and a predetermined amount of fluid is enclosed in each annular chamber.

5. The machine tool according to claim 1, wherein a tool can be attached to a tip end of the horizontally movable body via an attachment, and a weight of the weight can be adjusted according to the weights of the attachment and the tool.

* * * * *